United States Patent [19]
Geise

[11] Patent Number: 6,102,636
[45] Date of Patent: *Aug. 15, 2000

[54] HYDRAULICALLY POWERED SPINDLE FOR WORKING METALS AND COMPOSITE MATERIALS

[76] Inventor: Samuel C. Geise, 6620-B Willow Pointe Dr., Madison County, Huntsville, Ala. 35759

[ * ] Notice: This patent is subject to a terminal disclaimer.

[21] Appl. No.: 09/089,183

[22] Filed: Jun. 2, 1998

Related U.S. Application Data

[63] Continuation-in-part of application No. 08/651,815, May 21, 1996, Pat. No. 5,758,999.

[51] Int. Cl.7 ...................................................... B23C 1/00
[52] U.S. Cl. ........................... 409/231; 407/53; 408/230; 408/124
[58] Field of Search ................................... 409/231, 232, 409/141, 235, 138; 408/144, 145, 124, 230, 702; 407/53, 54

[56] References Cited

U.S. PATENT DOCUMENTS

| | | | |
|---|---|---|---|
| 3,224,301 | 12/1965 | Vickers | 407/130 |
| 3,703,846 | 11/1972 | Krafft | 409/232 |
| 3,863,316 | 2/1975 | Yeo | 407/54 |
| 4,572,714 | 2/1986 | Suzuki et al. | 407/54 |
| 4,637,775 | 1/1987 | Kato | 409/138 |
| 4,684,540 | 8/1987 | Underhuag | 409/138 |
| 4,740,120 | 4/1988 | Wickham et al. | 408/130 |
| 4,810,136 | 3/1989 | Paige | 407/54 |
| 4,819,526 | 4/1989 | Geise | 408/80 |
| 5,184,927 | 2/1993 | Judy | 409/143 |
| 5,201,619 | 4/1993 | Yodoshi | 407/54 |
| 5,312,212 | 5/1994 | Naumec | 409/138 |
| 5,518,346 | 5/1996 | Geise | 409/231 |
| 5,716,170 | 2/1998 | Kammermeier et al. | 408/145 |
| 5,758,999 | 6/1998 | Geise | 409/231 |
| 5,765,975 | 6/1998 | Hoffmann et al. | 409/138 |

FOREIGN PATENT DOCUMENTS

| | | | |
|---|---|---|---|
| 152703 | 6/1990 | Japan | 408/144 |
| 210315 | 7/1992 | Japan | 408/145 |

OTHER PUBLICATIONS

Tool and Manufacturing Engineers Handbook, Fourth Edition, vol. 1, Machining, Society of Manufacturing Engineers, 1983, Chapter 10, pp. 1, 2, 29–34, and 38–40.

Primary Examiner—Daniel W. Howell
Attorney, Agent, or Firm—Mark Clodfelter

[57] ABSTRACT

A machining system and method is provided wherein a hydraulic motor of the gear-type where high RPMs are desired, or a piston or GEROLER-type motor where high torque and lower RPMs are desired is mounted to a spindle forming a spindle assembly mountable to a robotic manipulator or other machine tool. Significantly, cutting tools or bits mounted in the spindle are provided with cutting edges having neutral or negative angles, which have been found to greatly facilitate machining operations in composite and other esoteric aerospace and aeronautical materials.

16 Claims, 8 Drawing Sheets

HYDRAULICALLY POWERED SPINDLE FOR WORKING METALS AND COMPOSITE MATERIALS

CROSS REFERENCE TO RELATED APPLICATION

This application is a continuation-in-part of U.S. patent application Ser. No. 08/651,815, filed May 21, 1996, now U.S. Pat. No. 5,758,999.

ORIGIN OF THE INVENTION

This invention was made with government support under proposed SMALL BUSINESS INCENTIVE contract No. 92-1 04.12 1604. The government may have certain rights in the invention.

FIELD OF THE INVENTION

This invention relates generally to apparatus and methods for working composite and metal materials, and particularly to systems including hydraulic motor and spindle assemblies, including tooling, which may be used in conjunction with computer numerical control machine tools, robotic manipulators, common machine tools and the like.

BACKGROUND OF THE INVENTION

Many recently developed composite materials, which typically consist of bonded layers of dissimilar materials, such as graphite composites including graphite/bismaleimide, graphite/phenolitic, graphite/polyimide, and other composites, have properties that cause them to be difficult to machine or otherwise work by conventional methods. In part, these difficulties arise due to relatively slow cutting speeds of cutting tools, which generate heat that in turn causes separation (delamination) of the various layers of materials. Also, as the design of conventional cutting tools depends on relatively high instantaneous pressures to advance cutting edges of the tool into the composite, chipping of the composite material frequently results. Further, many of these composites possess highly abrasive characteristics, and tend to wear cutting edges of conventional cutting tool bits at inordinately high rates. One attempt to circumvent these problems has involved the use of chemical etching wherein regions of a composite component that are to be unaffected by the etching process are coated with a "resist" material, with areas to be removed being exposed to a corrosive agent.

Problems with the etching process are that it is time consuming, and difficult, if not impossible, to precisely control removal of material from the component, making the process unsuitable for precision work. Additionally, there exists a risk of contamination to the environment, and hazards to workers due to toxicity and corrosiveness of the materials used in the etching process.

Manually operated cutting tools, such as die grinders, hand-held drills, and the like have also been tried, and have been found to be unsatisfactory because they are labor intensive and not productive of precise tolerances required by aeronautical and aerospace applications. Additionally, as one cannot hold or move a motor driven, hand held tool as precisely as a machine tool, the life of tool bits constructed of hard, brittle materials, such as carbide, are greatly reduced.

In addition to these problems related to machining of composite materials, advanced hardened metallic alloys such as Inconel, Waspaloy, NASA-23, 18-8 stainless steel, alloys of aluminium and lithium, 22-19 aluminium, Incaloy 903, titanium alloys, and other recently developed metallic alloys, present a wide range of problems when machining of these alloys is attempted. Here, characteristics of these materials that make them particularly applicable to aeronautical and aerospace applications, which include low mass, high melting temperature, hardness and toughness, etc, frequently results in the workpiece being chipped or otherwise roughened by spalling, galling, heat working, and other deleterious processes caused by relatively low speed of the tool bits during the machining process. Because of the effects of these deleterious processes, further grinding and polishing is required to finish the machined article. Additionally, as each cutting edge of a machine tool can only remove a tiny amount of the hardened material, typically only 0.001 to 0.002 inches per pass, these machining processes are time-consuming because of slow feed rates, and expensive due to breakage and wear of tool bits, some of which may cost hundreds or even thousands of dollars.

In these conventional machining processes, an electric motor powers a spindle to which in turn is mounted cutting tools or bits used in the machining process. Where the motor is powered by alternating current, and with conventional AC motors, only limited speed control of the motor is possible, generally due to multiple, selectively powered sets of windings in the motor, with motor speed dependent on the particular winding that is energized. In other instances, a frequency converter provides variable frequency and voltage to control motor speed.

In the instance of direct current motors, which are typically servo motors, rotational speed of the motor is controlled up to about 3,600 RPM by varying voltage applied to the motor. However, where an electrical motor is coupled to a spindle, sonic and harmonic vibrations from the motor, in addition to the incremental power surges that occur during operation as each respective winding of the motor is energized, are transmitted to the tool bit. It is believed that these surges and vibrations contribute to "dwell", a phenomena characterized by cutting surfaces of the cutting tool or bit momentarily hanging or digging into the surface of the workpiece being cut, which may result in dangerous explosive destruction of the fragile, brittle cutting tool or bits, and which certainly causes excess wear thereto. Additionally, the power surges and harmonic and sonic vibrations may cause "chatter", which in turn causes chipping and high wear of the tool bits. Further, servo motors require control circuitry, making them expensive, some of which approaching $80,000 in cost. Also, these bulky, heavy electrical motors do not lend themselves to be mounted to robotic manipulators or components of computer numeric control (CNC) machine tools, which are capable of supporting and precisely moving only limited weight.

In addition to problems related to the described power surges and harmonic and sonic vibrations associated with electrically powered spindles, cutting edges of conventional cutting bits are mounted at positive angles (the cutting edge angled toward the direction of rotation) with respect to the workpiece so as to dig or gouge material therefrom. This generates axial forces which tend to pull the cutting bits into the workpiece, which in conjunction with any side or axial play or looseness in the spindle, contributes to the problems of dwell and chatter. As a result, cutting bits are constructed having small cutting surfaces, and are generally configured to limit the amount of material that is removed by a cutting bit in a single pass or rotation. As a result, pressure and relatively low speed of the cutting tool is often required to advance the cutting bits into the workpiece, causing friction that generates large amounts of heat in the surface of the workpiece being cut, the resultant shavings, and the cutting bits. This heat, which otherwise would destroy the temper in treated alloys and the cutting bits, or cause warpage of the workpiece, is conventionally carried away by a coolant applied directly to the cutting or machining operation. As such, some machine tools must be equipped with provisions for pumping, applying, filtering and recycling such coolants, adding to machine tool costs and to costs of the machining operation in general, as these coolants must be periodically replaced.

In some instances, such as tool post grinders, an electrical motor is coupled to a spindle via a belt drive, and through a step-up pully system, is capable of driving the spindle at speeds of up to about 12,000 RPM or so. In this instance, some of the harmonic and sonic vibrations from the electrical motor are isolated by separation of the rotational member of the motor from the rotating spindle by the drive belt. However, since the motor is typically fixed to the same mounting member as the spindle, some motor vibrations are transmitted to the spindle, resulting in excess wear of the tool and less than optimum machinework as described. Further, with a belt drive, there is greater possibility of encountering dwell due to flexure of the belt during operation, which causes an elastic snapping or whipping motion of the spindle and toolhead. Further yet, these motors and spindles are expensive due to precision construction, and are relatively expensive to operate due to the necessity of frequent belt replacement.

Applicant has developed a portable, hand-held apparatus for cutting ends of boiler tubes at relatively precise angles. In this reference, Applicants U.S. Pat. No. 4,819,526, a portable pushcart supports a motor coupled to a hydraulic pump and reservoir of hydraulic fluid, the pump providing a source of hydraulic fluid under pressure. A high pressure line and return line are coupled from the pump to a hand-held tool which includes as a drive element a hydraulic motor, which develops about 45 inch-pounds of torque, and has an output shaft capable of being driven at speeds from about 3,000 to about 12,000 RPM, depending on the particular hydraulic motor used. A cutting tool mounted to the motor is disclosed as having a pilot shaft for centering the tool in a boiler tube, which tool also being provided with conventional carbide cutters for cutting edges of the tube. The cutters are each angled with a negative back rake, and are provided with means for limiting the cut of each cutter to a maximum cut of about 0.002 of an inch of the boiler tube end per pass. Also disclosed in this reference is the advantage that, since the tool is a hand-held tool, the hydraulic motor will absorb impact forces and shock when the cutting means engages a tube, reducing the probability that the cutting edges of the carbide cutters will be chipped or broken as a worker manually engages the tool with the end of a boiler tube.

While this apparatus works well for cutting relatively precise angles on boiler tube ends in preparation for welding the boiler tubes, it is not adaptable for any other operation, such as surface cutting (milling), involving precise, high speed machining operations of composite or esoteric alloyed metals such as those found in aeronautical and aerospace applications, due to the fact that it is a portable, hand-held tool rotating from 3000–12,000 RPM and is constructed only for bevelling the end of a tube at a selected angle. Further, since the maximum cut of each cutter is limited to 0.002", feed rates of material to this tool would correspondingly be limited to about 72" per minute at the maximum-disclosed rotational speeds of 12,000 RPM of the cutting tool. Additionally, there is no suggestion in the reference that the apparatus may be subjected to relatively high side (radial) loads, such as are required when high feed rates on the order of 200–600 inches per minute of material are encountered during surface cutting operations, the prior art device only being intended to receive axial loads as it is held by hand against the end of a boiler tube. Additionally, there is no provision for varying rotational speed of the motor and cutter, or for holding rotational speed of the cutter constant. Further yet, as the entire unit of the prior art is portable and highly mobile, being mounted on a pushcart, the drive motor provides only enough power to cut boiler tube ends, which is not sufficient power for the high-speed machining operations contemplated by the instant invention. Lastly, the pilot shaft of the hand-held tool, as described in the reference, could bind and cause the tool to abruptly cease rotation while engaged with a boiler tube, transferring the motor torque to hands and arms of the user, possibly causing injury thereto.

Accordingly, it is an object of this invention to provide a compact, lightweight, low-cost, hydraulically powered, high power spindle and power system capable of withstanding relatively high radial and axial loads, and being adaptable for utilizing a variety of newly-developed cutting tools and metal working tools of the hardest, most brittle materials. As an additional feature of the invention, rotational speed of the spindle is selectable, with the selected speed held constant irrespective of loading of the spindle. It is also an object of the invention to provide a lower speed hydraulic motor and spindle assembly that provides higher torque, the motor and spindle assembly being mountable in robotic manipulators.

As a further object of the invention, tooling is disclosed using neutral to negative angles on cutting edges thereof, these angles believed to enable higher cutting speeds and increase tool bit life.

SUMMARY OF THE INVENTION

A system for working metal and composites is disclosed wherein a hydraulic power source provides a source of hydraulic pressure. The hydraulic fluid under pressure is provided to a hydraulic motor coupled to a spindle rotatably supported in a spindle housing, the housing and spindle together forming a spindle assembly resistant to axial and radial loads. A tool for working metal or composites is coupled to the spindle shaft, with the hydraulic motor and spindle assembly mounted to a machine tool for accurate engagement of the metal working tool with a workpiece.

DETAILED DESCRIPTION OF THE DRAWINGS

Figure 1:
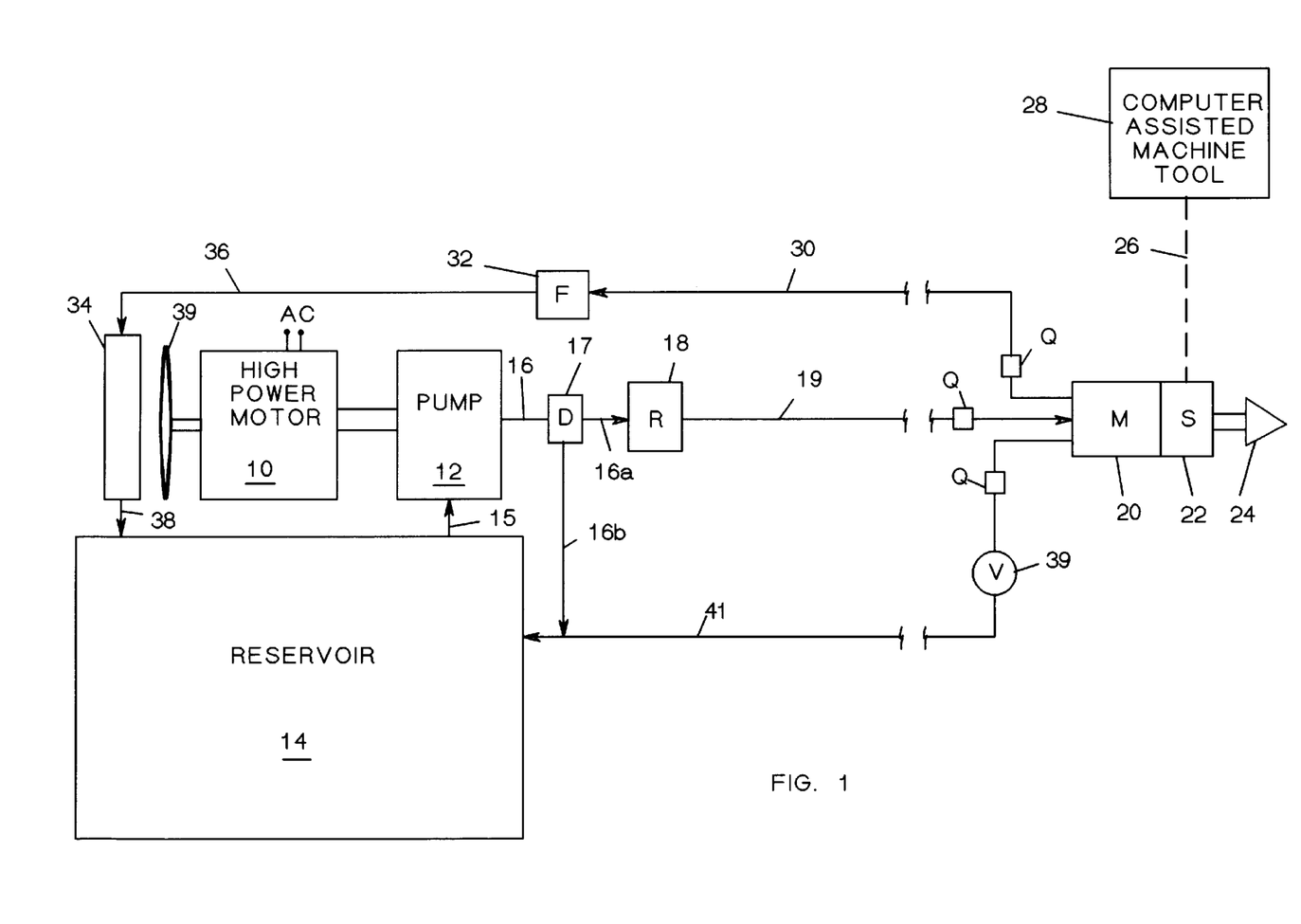
FIG. 1 is a schematic diagram of a system of the present invention.

Referring initially to FIG. 1, a schematic diagram of the present invention is shown. Here, a relatively large electric motor 10, which may be virtually any size, and typically may be a 230/460 volt, three phase, reversible, alternating current motor, is coupled to power a hydraulic pump 12. Alternately, an internal combustion motor may be used in place of electric motor 10, although a reversible transmission may be needed to reverse direction of rotation of the pump. In the lower horsepower ranges, up to about 20 horsepower or so, pump 12 may be a pump of the V-5 series, obtainable from the Vickers Corporation located in Statesville, N.C., which provides hydraulic fluid at a maximum flow rate of about 14.19 gallons per minute at a maximum pressure of about 3,000 PSI. In another embodiment of the invention, pump 12 may be up to about 60 horsepower or so, and provide up to about 5000–6000 PSI hydraulic pressure in order to power hydraulic motors that are designed to provide more torque, as will be further explained. Otherwise, pump 12 may be any hydraulic pump sized to have a power rating matched to that of electrical motor 10, and may further be reversible in order to reverse direction of the hydraulic motor and spindle.

As shown in FIG. 1, the input shaft of pump 12 is coupled to the output shaft of motor 10, with motor 10 and pump 12 mounted atop a reservoir 14. Reservoir 14 is appropriately sized in accordance with power requirements of the system, with about 30 gallons or so used for an electric motor and pump in the 20–30 horsepower range. A suction line 15 carries hydraulic fluid from reservoir 14 to pump 12, and a high pressure line 16 leads from pump 12 to a diverter 17, which may be of the microswitch type, and is equipped with a pair of hydraulic fluid outlets, one coupled via a high pressure line 16a to a flow regulator 18, which may be adjustable, and the other outlet coupled via a hydraulic line 16b back to reservoir 14. Diverter 17 functions as a safety device, and is set so that if hydraulic pressure from pump 12 exceeds a set pressure, typically between 2500–3000 PSI in a 3000 PSI system or about 5,500–6000 PSI in a 6000 PSI system, the flow of hydraulic fluid is diverted back to reservoir 14 via hydraulic line 16b, removing hydraulic power from the tool. Thus, if a rotating tool bit "hangs up" or is inadvertantly jammed into a workpiece, the resulting pressure spike of hydraulic pressure causes diverter 17 to dump hydraulic fluid back to reservoir 14, preventing dangerous explosive destruction of the cutting tool and possibly the workpiece.

Hydraulic line 16a from diverter 17 leads to flow regulator 18, which as stated may be adjustable, such as flow regulator part number FD4 DTHS, obtainable from the Ruckers Corporation of Racine, Wis. As one feature of this invention, flow rate of hydraulic fluid may be manually set, and held constant by regulator 18, allowing pressure of the hydraulic fluid to vary instantaneously and directly with load, so that only the power needed to hold RPM of the cutting tool constant is applied to the workpiece, as will be further described. Regulator 18 in turn provides pressurized hydraulic fluid at the selected, constant, flow rate via a flexible high pressure line 19, which may include a quick disconnect coupling Q, to a hydraulic motor 20. Alternately, where maintaining a constant RPM of the tool is not critical, flow rates may be allowed to vary so that rotational speed of the cutting tool varies with load.

A flexible, low pressure return line 30 (FIG. 1) carries exhausted hydraulic fluid from motor 20 to a filter 32 coupled to a heat exchanger 34 by a line 36, which effects cooling of the hydraulic fluid prior to returning the fluid to reservoir 14 via line 38. A fan 39 coupled to motor 10 may be used to force air through heat exchanger 34, or a separate motor and fan (not shown) may be used for this purpose.

As a second, redundant safety feature, a pressure relief valve 39 may be coupled to motor 20 via a low pressure line and quick disconnect coupling Q, with the output of valve 39 coupled to reservoir 14 by a low pressure line 41. Valve 39 would be typically be set at the maximum pressure of 3,000 PSI for a 3,000 psi system or 6,000 PSI for a 6,000 PSI system so that in the event of overloading of motor 20, destructive overpressurization of the system is avoided by relief valve 39 dumping hydraulic fluid back to reservoir 14.

Figure 7:
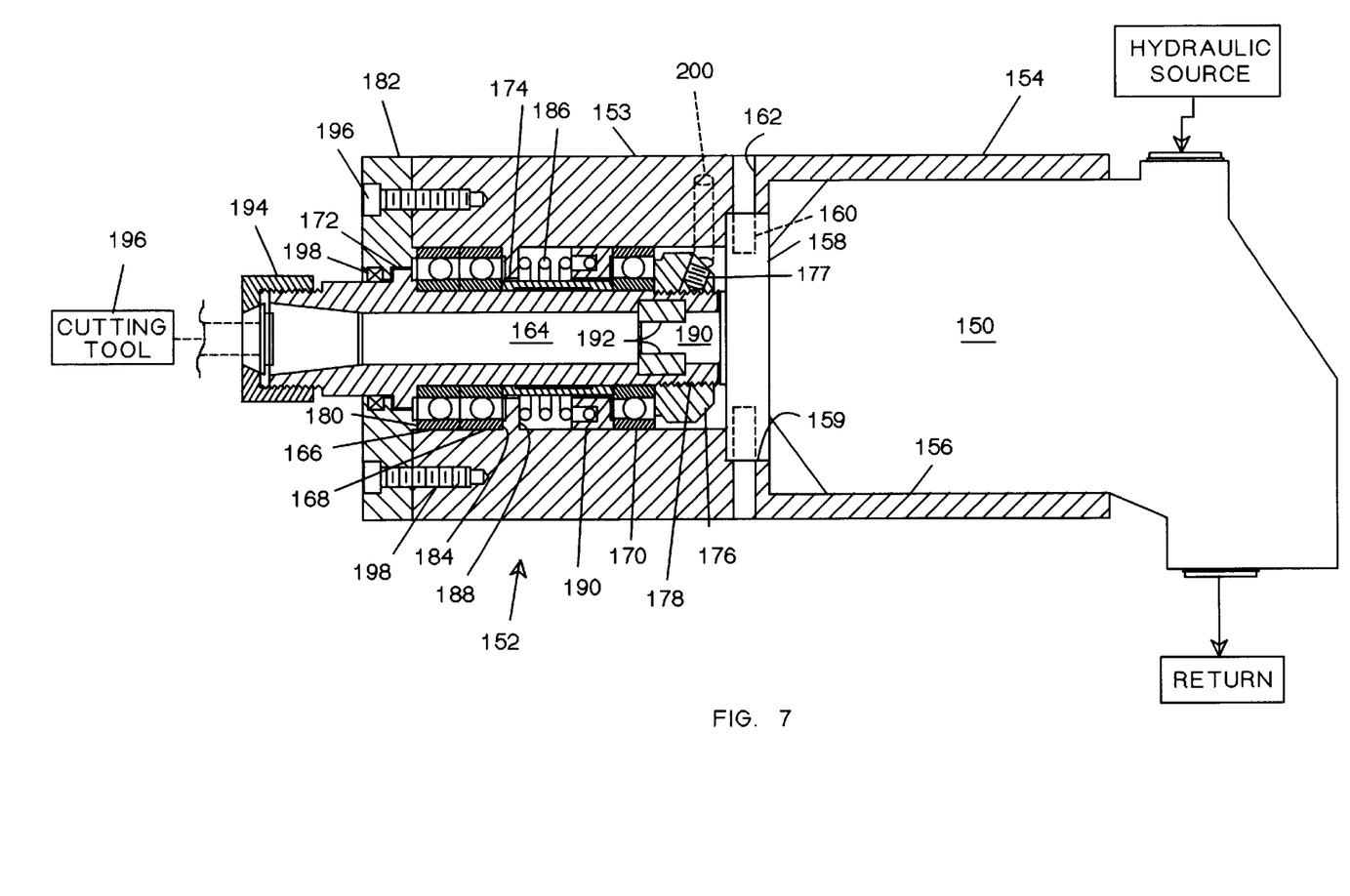
FIG. 7 is a partially cut-away view of a spindle and motor assembly utilizing a high torque hydraulic motor.

Motor 20 may be any suitable hydraulic motor, such as a gear-type motor available from Oildyne Corporation, of Minneapolis, Minn., and which are sized to the pump and motor so as to develop the power provided by pump 12. For higher pressure systems in the range of about 5000–6000 PSI or so, GEROLER-type hydraulic motors and piston-type hydraulic motors may be used, these motors being available from the HYDRAULIC VALVE DIVISION of PARKER-HANNIFIN CORP, located at 520 TERNES AVE., ELYRA OHIO. Here, as shown in FIG. 7, a piston-type motor 150 is mounted to a spindle 152, motor 150 sized in the power range of from about 10 to 60 horsepower or so. As stated, these motors are better suited to develop higher torque than a gear or vane-type motor, although piston-type and GEROLER-type motors turn at lower RPMs than gear or vane-type motors. For example, a 10 horsepower piston-type hydraulic motor may have a maximum RPM rating of from about 18,000–20,000 RPM or so, while a 60 horsepower hydraulic motor may have a maximum RPM rating of about 6,500 RPM or so. These slower speeds with higher torques allow use of cutting tool holders of a larger diameter, which in conjunction with cutting tool inserts constructed of or coated with recently developed coatings such as silicon nitride, boron carbide, boron nitride and cutting bits constructed of ceramic alumina with microscopic silicon carbide fibers allow greatly increased feed rates in surface cutting operations.

Figure 1A:
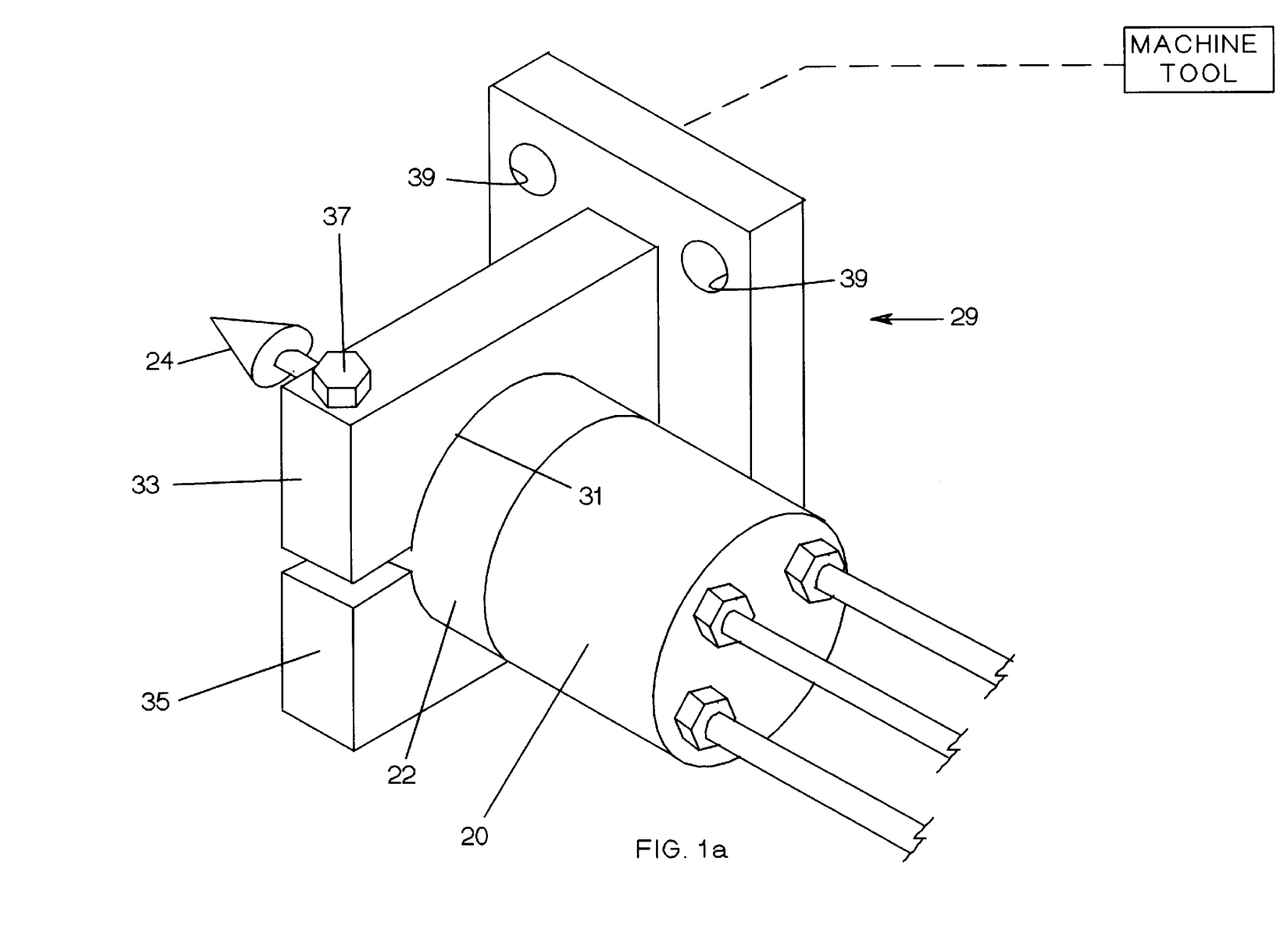
FIG. 1a is a pictorial illustration of a fixture adapted for mounting to a machine tool, and for receiving a spindle of a motor and spindle assembly of the present invention.

Motor 20, a gear-type motor, and other similar hydraulic motors, are remarkably small for the power they are capable of delivering, being on the order of about 3 inches in diameter, 4 inches in length, and weighing about two pounds for a 15–20 horsepower gear-type hydraulic motor. Motor 20 is coupled to a spindle assembly 22 provided with a cutting tool or other metal working tool 24, with motor 20 and spindle assembly 22 mounted in a robotic manipulator or like member 26 (dashed lines) of a machine tool 28, typically of the type which is computer controlled. In this example, the motor and spindle assembly, being of exceedingly small size and weight, are easily mounted in a fixture 29, such as that shown in FIG. 1a, which in turn is mounted to a machine tool, which may be a computer controlled machine tool such as lathes, drill presses, robotic manipulators, or conventional machine tools such as are found in conventional machine shops. Fixture 29 is provided with a support plate having an opening 31 defined by split portions 33 and 35, with a pinch bolt 37 serving to clamp portions 33 and 35 against spindle 22. Openings 39 in a base plate serve to receive fasteners for affixing fixture 29 to an appropriate member 26 (dashed lines) of machine tool 28. Additionally, in the instance where a CNC machine tool is provided with a receptacle for receiving a conventional tapered toolholder, motor 20 and spindle 22 may be affixed to a tapered toolholder adapted to receive the combined motor and spindle, and perform hydraulically powered operations on a workpiece mounted to a movable fixture under computer control. In this instance, a hydraulic motor and spindle assembly mounted directly to the tapered toolholder and supporting a spindle as described above allows retrofit of existing conventional electrically powered spindles mounted to tapered toolholders. Here, the hydraulic motor housing and spindle may be constructed of a high strength alloy, or an alloy selected to reduce thermal expansion and contraction. Also, cooling or maintaining temperature of the hydraulic fluid at a constant temperature may be done in order to minimize thermal expansion and contraction of the motor and spindle.

Figure 2:
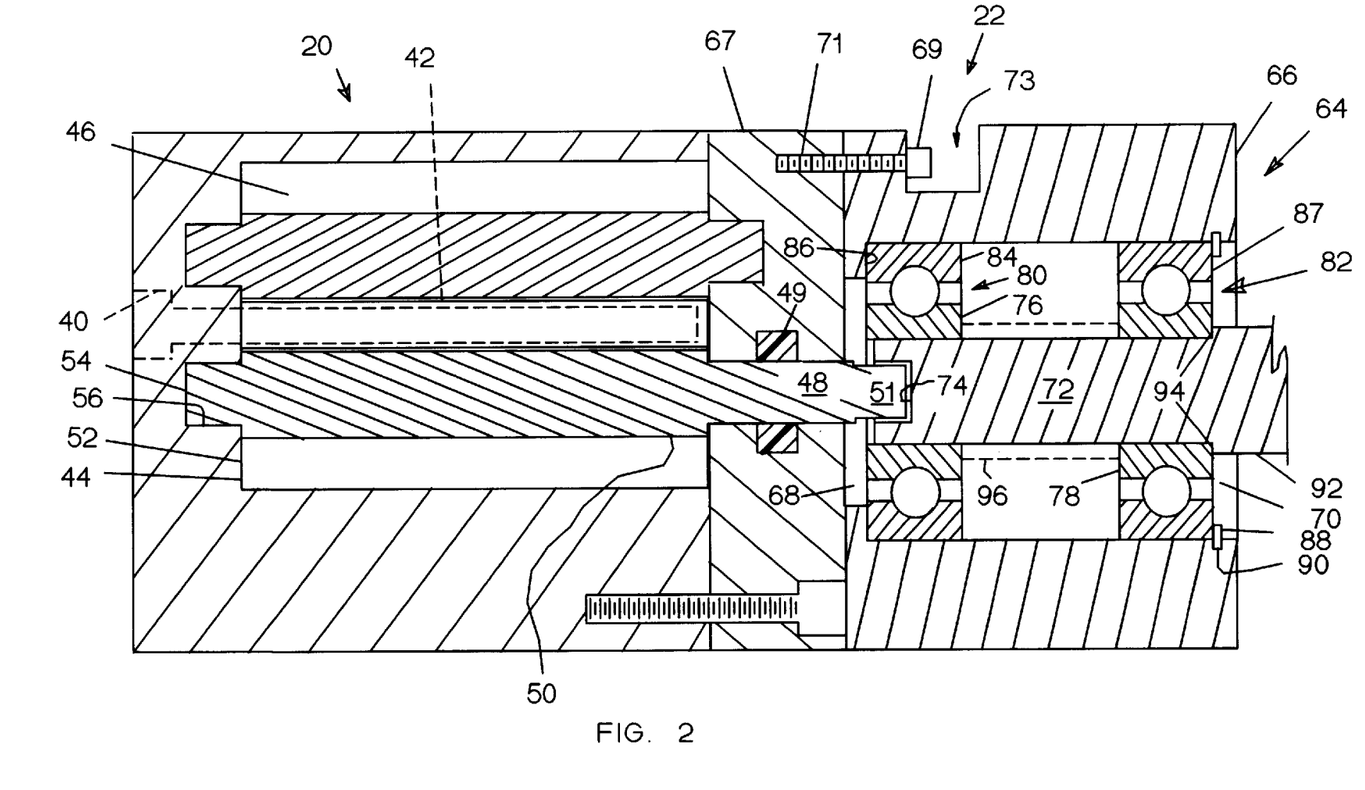
FIG. 2 is a cut-away view of a motor and spindle assembly of the present invention.

In one application, and as shown in FIG. 2, a gear-type motor is generally constructed having a housing of aluminium, with side-by-side, communicating cylindrical recesses extending along the length of the housing, each rotatably containing an elongated gear which closely fits the respective recess to minimize leakage of hydraulic fluid around the gears. Hydraulic fluid under pressure enters to one side of the rear of the motor at an opening 40, and is forced at slot 42 (dashed lines) through elongated gears 44 and 46, respectively. These gears are in closely meshed relation so as to reduce leakage of hydraulic fluid therethrough. As such, for a given volume of hydraulic fluid forced between gears 44 and 46, a set number of revolutions of the gears results. Gear 44 is affixed to an output shaft 48 at end 50 thereof, with a rectangular-in-cross-section key region 51 provided at the end of output shaft 48. Output shaft 48 may be supported by a bushing in a bore through the end cap of motor 20, or may be supported by roller bearings such as "needle bearings" pressed into an opening of the cap (not shown). One or more seals 49, which may be labrynth seals, are provided in the end cap and around output shaft 48 to prevent leakage of hydraulic fluid from around the output shaft.

End 52 of gear 44 is provided with a stub shaft 54 rotatably supported in a blind bore 56 cut directly into the motor housing, by a bushing, or may be supported by needle bearings (not shown) pressed into an opening of the motor housing.

Gear 46 is an idler gear having a stub shaft at each end thereof, one of which stub shafts rotatably supporting gear 46 at one end in a blind bore cut directly into the aluminium material of the motor housing, with the other stub shaft rotatably supporting the gear at the other end in a blind bore cut into the motor cap. Gear 46 may also be supported by bushings or needle bearings as described for gear 44. The gears, stub shafts and output shaft are all constructed of steel, and ride on hydrostatic bearings provided by the hydraulic fluid circulating through the motor, which hydrostatic bearings also serving as a cushion to absorb sonic and harmonic vibrations.

Hydraulic fluid passing through the gears is exhausted from the motor via a second slot (not shown) positioned opposite slot 40 on the other side of gears 44 and 46, which oppositely positioned slot communicating with a second opening coupled to low pressure return line 30. While this motor is capable of developing the power from pump 12, it is not constructed to withstand side (radial) or axial loads on the output shaft due to the steel shafts and ends of the gears being separated from the soft aluminium material of the motor housing and cap only by a thin hydrostatic bearing, or by needle bearings not sufficiently durable to withstand such loads. As such, any significant side or axial loads applied to the output shaft will overcome the hydrostatic bearings or cause damage to the needle bearings, ruining the motor.

In order to overcome this problem, and as a feature of this invention, a compact, heavy-duty spindle has been developed to absorb radial loads incurred during milling or other surface cutting operations where high feed rates on the order of 200–600 inches-per-minute are experienced. As shown in FIG. 2, spindle assembly 22, which is constructed of a harder metal than the aluminium housing of motor 20 so as to be clampable in opening 31 of fixture 29 (FIG. 1*a*) or otherwise configured to be mountable to a tapered toolholder, is illustrated as having a housing 66 which may be the same or similar diameter as motor 20 (about 2–3 inches) and being of a length of about 2–3 inches. This motor and spindle assembly together form an assembly of only about 4 to 6 inches in length for a motor in the 15–20 horsepower range, and which is capable of developing constant rotational speeds of up to about 30,000 RPM. Where the application requires higher power, the hydraulic motor and spindle assembly would be correspondingly larger. As stated, actual power developed by motor 20 is dependent on load, with maximum power of hydraulic motor 20 being that developed by electric motor 10. A high level of power applied to motor 20 is an important feature of the instant invention, and where the application involves cutting, facilitates transferrance of most of the heat generated by the machining process to the removed material. Additionally, these qualities further allow for high feed rates characterized by the instant invention, and assist in preserving cutting edges of the tool bits disclosed herein.

Housing 66 of spindle 22 (FIG. 2) defines openings 68 and 70 at each end thereof, with the keyed portion 51 of output shaft 48 of motor 20 extending through opening 68. A spindle 72 having a rectangular, mating keyway 74 for receiving keyed region 51 of output shaft 48 is rotatably supported in housing 66, as by a press fit with inner races 76 and 78, respectively, of precision high speed ball bearings 80 and 82, such as bearings 9102PP, obtainable from Fafnir Corporation, of New Briton, Conn. Bearings 80 and 82 are constructed to very close tolerances, with virtually no axial movement or side movement thereof, and can withstand axial loads of 560 pounds, and side loads of 1400 pounds without significant wear or deflection. As such, the cutting tool 24 (FIG. 1*a*) is held particularly stable during operation. The outer race 84 of bearing 80 is abutted, as by press fit, against a lip 86 adjacent opening 68, while the outer race 87 of bearing 82 is located, as by press fit in opening 70, against a circular clip 88 fitted into a groove 90 in opening 70. A region 92 of enlarged diameter is machined on spindle 72, forming a wall 94 about spindle 72, with the inner race 78 of bearing 82 pressed onto spindle 72 until race 78 abuts vertical wall 94. A spacer 96 (dashed lines) may be positioned as shown to assist in locating bearings 80 and 82 during the pressing operations, or housing 64 may be constructed of shortened length (not shown) so that the respective inner and outer races of bearings 80 and 82 are pressed into abutting relation.

Spindle 72 extends through opening 70 of housing 66, and terminates, in one embodiment, with a surface cutting head 98 (FIG. 4) machined integral with spindle 72. With this construction, and unlike the prior art device, there are no threaded or other connections between the spindle and the cutting head that would otherwise tend to introduce imbalance of the cutting head that in turn would produce unacceptable vibration of the tool. Further, the spindle and integral cutting head may be further subjected to dynamic precision balancing procedures in order to perfectly and permanently balance spindle 72 and head 98. Where reaming or drilling type operations are required, a centering chuck (not shown) may be installed at the end of spindle 72 to receive drilling type tool bits. Here, the end of spindle 72 may be provided with precision machined keyways (not shown) longitudinally positioned on output shaft 72, as is known to those skilled in the art, for receiving the chuck. While precise balancing of a centering chuck is not as critical as the larger-in-diameter tooling required for surface cutting operations, it may be desirable to balance the spindle and chuck assembly after the chuck is installed due to the high rotational speed of the tool. Housing 66 (FIG. 2) may be coupled to end 67 of motor 20 by means of screws or bolts 69 positioned in openings 71 in cutout regions 73 of housing 66 (only 1 cutout shown), with each screw or bolt 69 engaging a threaded opening in end 67 of motor 20. Thus, with a separate spindle assembly having its own particular cutting or machining head integral with the spindle, it is a relatively easy task to simply change the spindle assembly each time a different machining operation is required, or to simply change the motor and spindle assembly as a unit, the hydraulic lines being quickly connected and disconnected by quick-disconnect couplings Q (FIG. 1) located proximate motor 20, as are well known by those skilled in the art. Where higher axial or radial loads are contemplated, or for longer spindle life, a plurality of bearings may be stacked adjacent bearing 82 in an elongated housing.

In another embodiment as shown in FIG. 7, a piston or GEROLER-type motor 150 is mated to a spindle assembly 152 having a housing 153 configured having a sleeve region 154 for closely receiving a cylindrical portion 156 of motor 150. Motor 150 may be provided with a mounting flange 158 which fits inside a recess 159 in housing 153, flange 158 having a plurality of threaded openings 160 that communicate with bores 162 in housing 153. Bolts or capscrews (not shown) may be used to mount motor 150 in housing 153, the bolts or setscrews threadably engaging threaded opening 160 in flange 158 and being tightened against housing 153. Spindle assembly 152 rotatably supports a spindle shaft 164 by bearings 166, 168, and 170, these bearings being precision high-speed angular contact bearings in order to precisely support shaft 164 without appreciable flexure, end or side play in order to maintain close machine tolerances. Bearings 166 and 168 are positioned together at the front of spindle assembly 152 so as to distribute side loads developed during surface cutting, friction stir welding and other such operations. The inner race of bearing 166 rests against a lip 172, with the inner race of bearing 168 bearing directly against the inner race of bearing 166. A spacer 174 is positioned between and bears against the inner races of bearings 168 and 170, with a locking nut 176 threadably engaging threaded region 178 of shaft 164 and bearing against the inner race of bearing 170. A setscrew 177 may be employed to lock nut 176 in place on shaft 164. In this manner, the inner races of angular contact bearings 166, 168 and 170 are locked between lip 172 and locking nut 176, with bearing 170 being in spaced relation with respect to bearings 166 and 168. The outer races of bearings 166 and 168 are locked between an interior ridge 180 in end cap 182 and a corresponding ridge 184 in housing 153. The outer race of bearing 170 is preloaded by a compression spring 186, which exerts pressure between a lip 188 and a spring carrier 190, which in turn bears against and preloads the outer race of bearing 170. The outer races of bearings 166 and 168 may be preloaded by selected thicknesses of shims between lip 172 and the inner race of bearing 166.

Spindle shaft 164 may be coupled to output shaft 190 of motor 150 by keys 192 in matching keyways in output shaft 190 and spindle shaft 164. At the other end of spindle shaft 164 is mounted a collet or chuck 194 for holding a cutting tool, drill, friction stir welding or other tool 196. Where desired, spindle shaft 164 may be balanced to reduce or eliminate vibration.

End cap 182 is fastened to housing 153 by cap screws or other similar fasteners 196, which thread into threaded openings 198 in the end of housing 153. For preventing contamination from entering into the spindle assembly, an appropriate seal 198, such as a labrynth or mechanical seal, is incorporated into end cap 182 around spindle shaft 164. At the opposite end of housing 153 is provided an opening 200 through which may be provided a positive pressure of dried and filtered air or other dry gas, such as nitrogen, so as to pressurize the spindle housing and further prevent contamination from entering the spindle assembly. Alternately, a vacuum may be applied to the interior of the spindle so as to evacuate any seepage of hydraulic fluid from motor 150, preventing leaking hydraulic fluid from ruining bearings 166, 168 and 170. In these latter instances, an O-ring seal may be provided at the interface between motor 150 and recess 159.

Figures 3, 3A, 3B, 3C, 3D, 3E, 4:
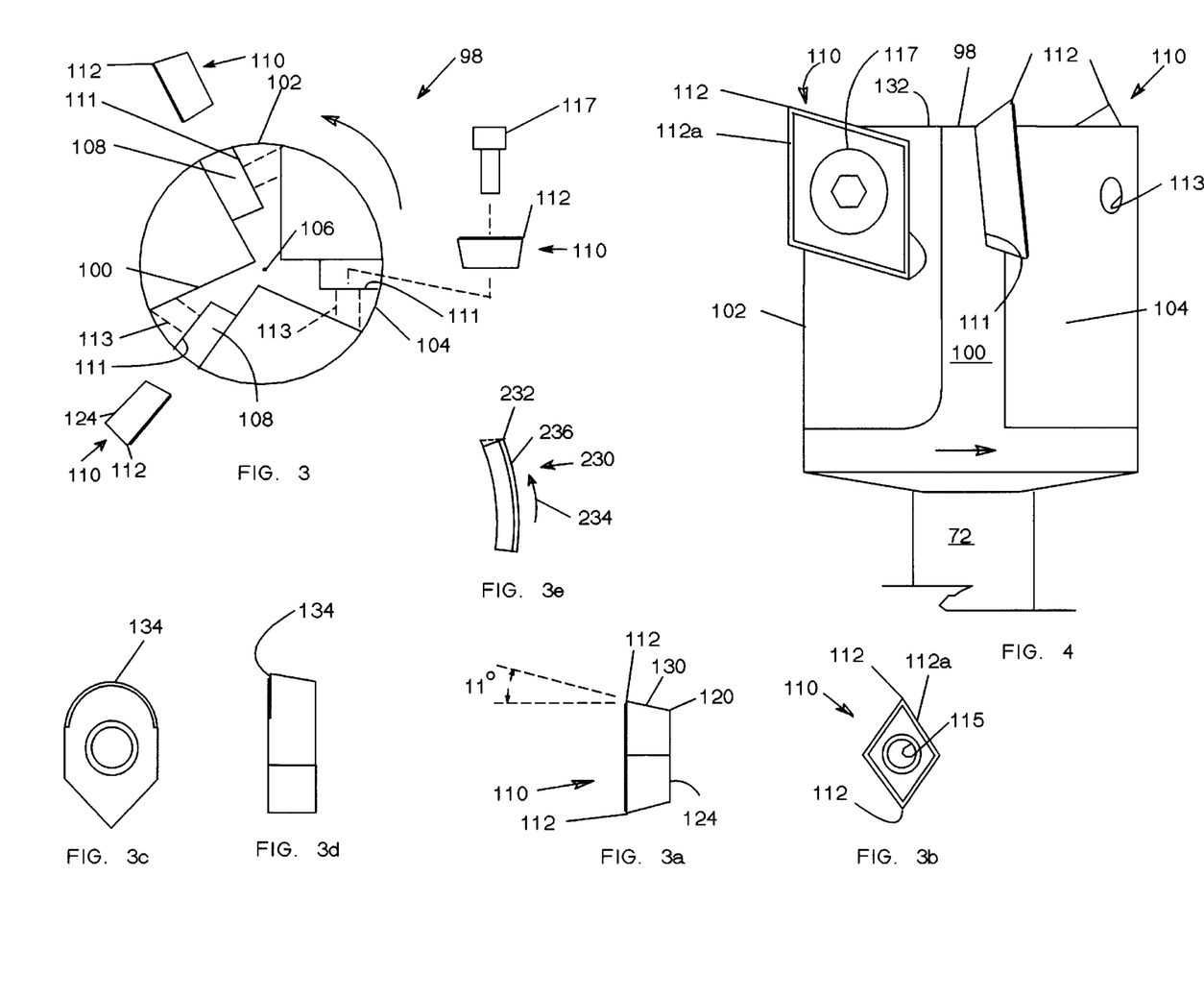
FIG. 3 is an end view of a surface cutter of the present invention.
FIGS. 3a and 3b are elevational and side views, respectively, of a first tool bit used with the cutter of FIG. 3.
FIGS. 3c and 3d are elevational and side views, respectively, of a second tool bit used with the cutter of FIG. 3.
FIG. 3e is a bottom view of a radiused tool bit.
FIG. 4 is an elevational view of the surface cutter shown in FIG. 3.

Surface cutting head 98, as particularly shown in FIGS. 3 and 4, and as one example of a cutting tool of the present invention, is constructed having three outwardly extending arms 100, 102, and 104 extending radially outward from a center point 106 of head 98, with each arm provided with a recess 108 for receiving a closely fitting, diamond-shaped tool bit 110. A rearward wall 111 is formed in each of recesses 108, each wall 111 having a threaded opening 113 (dashed lines) therein.

Each tool bit 110 is provided with edges 112 (FIGS. 3a, 3b) at the apex of opposed ends of each bit, with each edge 112 extending beyond the end of head 98 when the bits are installed in their respective recesses 108. Edges 112 are defined by a forwardly facing, slightly recessed wall or surface 112a and edges thereof leading to edge 112, and an edge 130 angled about 11 degrees with respect to surface 112a terminating at edge 112 in a slight radius of about 0.010–0.020 inches. Angling of edge 130 with respect to cutting edge 112 provides a cutting clearance, with cutting bits having different clearance angles selected for different materials. Here, the clearance angle is reduced where harder materials are machined, and may be increased where softer materials are machined. For affixing each tool bit in its respective recess, a centrally located opening 115 (FIG. 3b) in each bit is provided, and through which a fastener, such as a machine screw 117 (FIG. 3), is inserted and threadably engaged with one of openings 113 in arms 100, 102, 104. With this construction, it is seen that the bits are fully supported in each respective recess, with cutting forces imparted to cutting edges 112 transferred directly to head 98 by bit surfaces 124 and recess surfaces 111 (FIG. 3). Further, in one embodiment of geometry of tools of the present invention, each of recess surfaces 111 may be inclined from about 0–10 degrees away from the direction of rotation, as shown in FIG. 4, giving cutting edge 112 a neutral or negative rake. As such, the cutting action of the present invention is characterized by high rotational speed of head 98 (15,000 to 30,000 RPM) in conjunction with a scraping or shearing action of the cutting edges that is believed to fracture and shatter material to be removed from the workpiece, reducing heat generated by the cutting process. This action apparently arises in part from the properties of the materials contemplated to be machined by the method and apparatus of the present invention, which as stated, are newly developed composites and metallic alloys designed for aerospace and aeronautical applications, and which possess particular abrasiveness and hardness that generally defies conventional machining techniques. As such, Applicant's apparatus and method is highly advantageous inasmuch as deleterious effects due to heat on the machined article are greatly reduced, while permitting high feed rates of the workpiece. Of course, conventional materials may also be advantageously cut, machined, drilled or friction stir welded by Applicant's apparatus and method. Also, by utilizing a neutral or negative rake on the cutting edges of the tool bits, dynamic forces on the tool bits that tend to dull or break the tool bits are reduced or eliminated, extending life of the cutting bits. This is believed to be at least in part due elimination of positive edges that pull the bit into the workpiece and exert high stresses on the weakest, thinnest edges of the cutting bit. In contrast, use of neutral or negative edges on cutting edges tends to generate stresses that are imparted to stronger, thicker regions of the cutting bit and which further tend to push the cutting bit out of the workpiece rather than causing it to dig into the workpiece. This action, in conjunction with high rotational speeds, has proved to be a major advancement in machining and metalworking.

Alternately, as shown in FIGS. 3c and 3d, cutting bits each having a radiused cutting edge 134 are believed to provide better machining at high feed rates by providing increased surface area of the cutting bits and more graduated advancement of the cutting edges 134 into the workpiece in combination with high rotational speed of the spindle. Also, FIG. 3e shows a bottom view of a cutting bit 230 having a cutting edge 232, bit 230 being mounted in a toolholder (not shown) such that rotation is in the direction of arrow 234. As should be apparent, cutting forces in this embodiment are transferred lengthwise through the bit, reducing breakage. Cutting edge 236 may be a sharp edge with a neutral rake, and spiraling slightly outward with respect to the workpiece so that metal of the workpiece is sheared therefrom along the length of cutting edge 236. Alternately, point 232 and edge 236 may be radiused as shown for edges 134 in FIGS. 3c and 3d shearing material from the workpiece by edge 232. The initial cutting edge 232 may be provided as described with a neutral angle or a negative angle (dashed lines).

For machining composite materials, the cutting tool inserts may be constructed of advanced materials such as those developed by Greenleaf Corporation, of Saegartown, Pa., which are ceramic materials containing or having cutting edges coated, as by vapor deposition, with a material or materials of the class having a hardness generally above Rockwell C 90. These materials include cubic boron nitride, silicon nitride, diamond, or other ultra hard materials which are deposited on hard substrates, such as ceramic, by the Norton Corporation, of Wister, Mass. Feed rates in a workpiece constructed of a composite material, when using these coated ceramic bits during surface cutting and routing operations, may be as high as 600 inches per minute at a spindle speed of 30,000 RPM. At this high rotational speed, the cutting edges of a rotating tool such as surface cutter 98, which has three cutting edges, may remove up to 0.066 inches of composite material per pass, or 0.02 inches of material per revolution of the tool, without delamination, chipping, significant heat buildup, or significant wear of the tool bits. As increasing depth of the cut increases hydraulic pressure applied to motor 20, as does increasing feed rates, depth of the cut taken by head 98, in conjunction with the feed rate, may be adjusted so that hydraulic pressure applied to motor 20 does not exceed the trip limits of diverter 17 or relief valve 39 (FIG. 1), and may be as high as 0.01 inches or greater for a hydraulic system using a 20 horsepower electric motor. Where hardened, alloyed metals such as Inconel 718, NASA-23, KBK-75, 18-8 stainless steel, aluminium lithium alloys, 22-19 aluminium, Incaloy 903, titanium alloys, 9-4-30 steel, etc, are to be cut or machined, the tool bits may be constructed as described above of ceramic materials, and may further include an alumina ceramic material containing tungsten fibers, which material and tool bits also having been recently developed by the Greenleaf Corporation. Where a harder base metal may be required, carbide or other hardened metallic alloys may be used to construct the cutting bits, with the cutting edges coated with one or more of the materials having a hardness greater than Rockwell C 90 as described above. Of course, conventional carbide and other cutting bits may also be used, but they require more frequent maintenance due to more rapid dulling of cutting edges thereof. Life of these cutting bits should be lengthened by providing neutral to negative angles to the cutting edges for reasons described above. Feed rates of cutter bits constructed of these metallic alloys, as with composites, is adjusted in conjunction with the depth of the cut in order to keep hydraulic pressure below the trip limit, or upper hydraulic pressure limit, of diverter 17 and relief valve 39, and may be as high as 400 inches per minute with a spindle speed of 30,000 RPM, meaning that 0.013 inches of metal per revolution is removed by the above-mentioned surface cutter, or 0.0044 inches per cutting edge per revolution. Of course, with softer materials, such as aluminium, the depth of cut may be greater, up to about 0.010 inches, while with harder materials the depth of cut must be correspondingly reduced. In any case, machining is accomplished without any significant heat buildup of the workpiece or the tool bits, the heat generated by the cutting process being transferred almost exclusively to the particles removed from the workpiece, as will be further explained.

Figure 8:
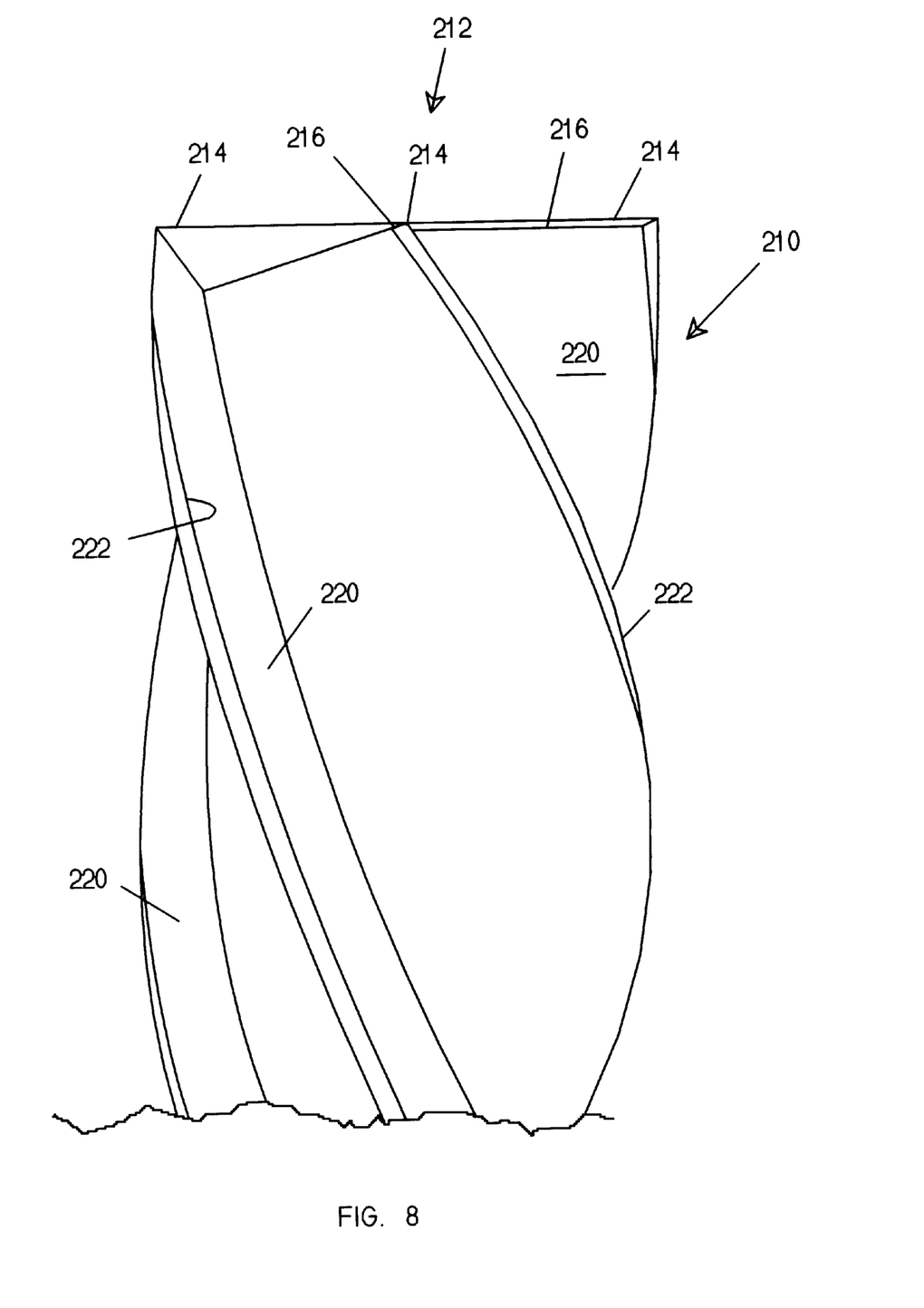
FIG. 8 is a side planar view of an end mill having negative cutting edges.
Figure 9:
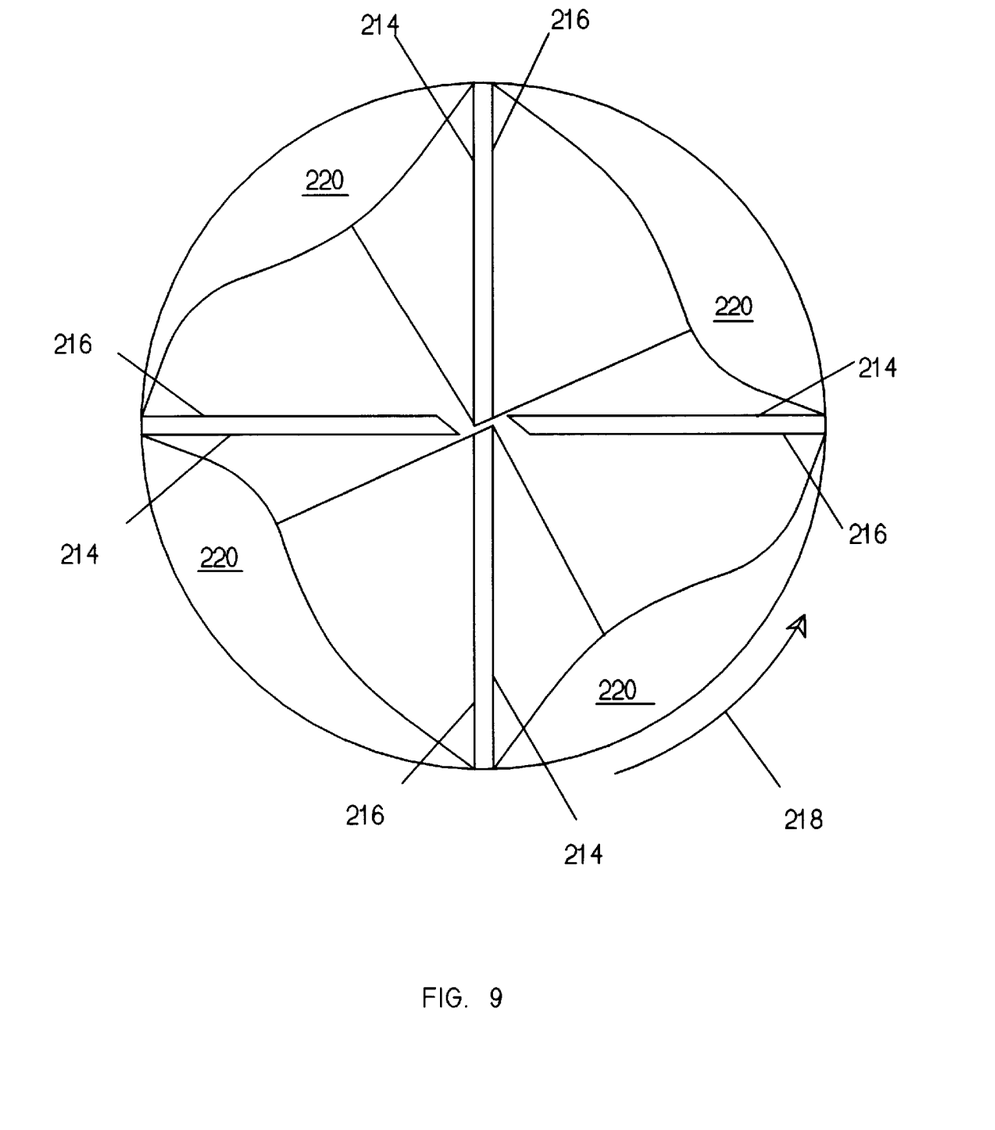
FIG. 9 is an end view of the end mill of FIG. 8.

As another example of a cutting tool of the present invention, reference is made to FIGS. 8 and 9, which illustrate an end mill 210. Mill 210 has an end 212 adapted to drill the above-described composite and alloyed materials, and may be constructed of alumina ceramic or another hard substrate coated with a coating having a hardness in excess of Rockwell C 90. Mill 210 has a flattened end as opposed to a pointed end as is typical of drill bits, and has four cutting edges 214 across the end thereof that each has a negative radial rake and a clearance region 216. Rotation of mill 210 is counterclockwise, as indicated by arrow 218 of FIG. 9, meaning that cutting edges 214 of end 212 have a negative radial rake (best seen by edge 214 of FIG. 8) so as to scrape and shear material from the workpiece. It will also be noted that flutes 220 spiral in a direction so that cutting chips and powder are driven down into the drilled opening. Since flutes 220 will not bring chips and powder out of an opening during the process of drilling, it is contemplated that chips and powder developed during the drilling process are to be vacuumed or blown with air out of the hole significantly, the direction of spiral of the flutes which is in an opposite direction to that normally found in the art, is believed to assist in neutralizing axial forces on the end mill. Also, edges 222 of the flutes are sharpened with a neutral to negative axial rate so as to scrape material from sides of the drilled opening. Also, with this configuration of flutes, it is possible to drill an opening and then move the end mill sideways in a surface cutting or routing operation. Thus, while tool 210 has characteristics of an end mill, it will perform both drilling and surface cutting or routing operations. In any case, the cutting edges of mill 210 are neutral to negative in accordance with the instant invention.

While Applicant's system as disclosed herein may be used with cutting tools, such as drilling, surface cutting, reaming, etc, the system may be used to power other types of operations, such as friction stir welding, that do not involve cutting operations. Here, RPM of the spindle may simply be adjusted as described by flow regulator 18 in order to maintain the desired RPM, which may be lower than the 15,000 RPM as disclosed in the foregoing. With the described flow regulator, RPMs may be adjusted to as low as about 1000 RPM where low RPM operations are performed. Additionally, with improvements of the spindle bearings, RPMs of metal and composite working operations may be increased well beyond the disclosed 30,000 RPM. For instance, INGERSOL CORPORATION™ has developed and is currently testing fluid bearings that are rated as high as 80,000 RPM. In this instance, Applicant's hydraulic system coupled to a spindle incorporating the fluid bearings of INGERSOL would result in a hydraulic spindle capable of generating high power and high RPMs with the advantage of providing a fluid cushion that dampens undesirable vibrations.

In use, the source of hydraulic fluid is prepared for operation, with microswitch diverter 17 set to divert hydraulic flow from motor 20 to reservoir 14 at a pressure generally between 2500–3000 PSI. A spindle assembly having a hydraulic motor attached thereto as described above is clamped in opening 31 of a fixture 29, in turn connected to a computerized or other machine tool as described. Where other types of mounting fixtures are used, such as a tapered mounting, the hydraulic motor and associated spindle are mounted as would be appropriate for that mount. Electrical power is applied to motor 10, causing pump 12 and regulator 18 to provide a constant flow of hydraulic fluid to hydraulic motor 20. As stated, pressure of the hydraulic fluid provided to motor 20 varies directly with load, with flow, and thus RPM of the cutting head, being held constant. If, for whatever reason, pressure of hydraulic fluid from pump 12 exceeds the trip pressure of diverter 17 or relief valve 39, the flow of hydraulic fluid is dumped back to reservoir 14. Thus, if a selected feed rate is exceeded or proves too great, or the tool becomes blocked by accident, power applied to the cutting head is removed, preventing damage to the tool and possibly to the workpiece.

Figure 5:
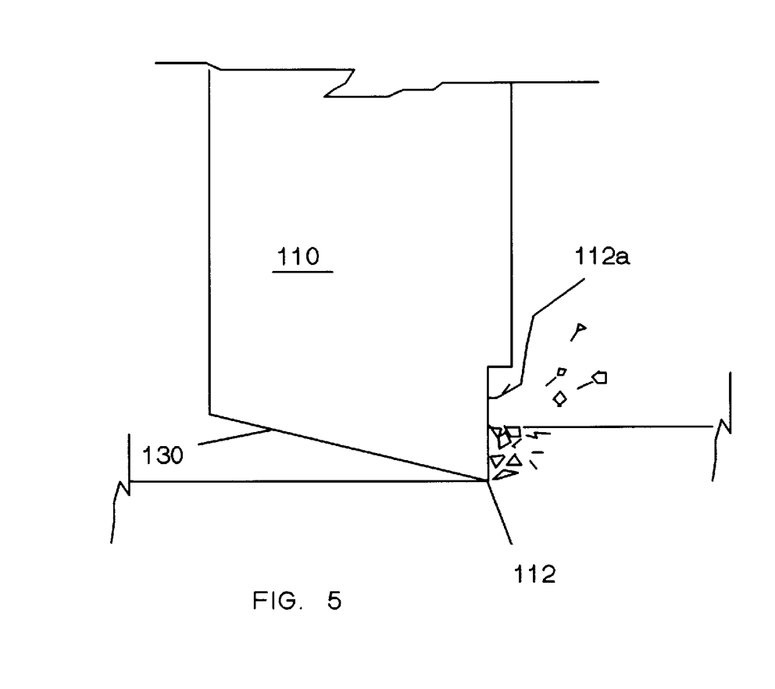
FIGS. 5 and 6 are enlarged, cut-away side views illustrative of operation of the present invention.
Figure 6:
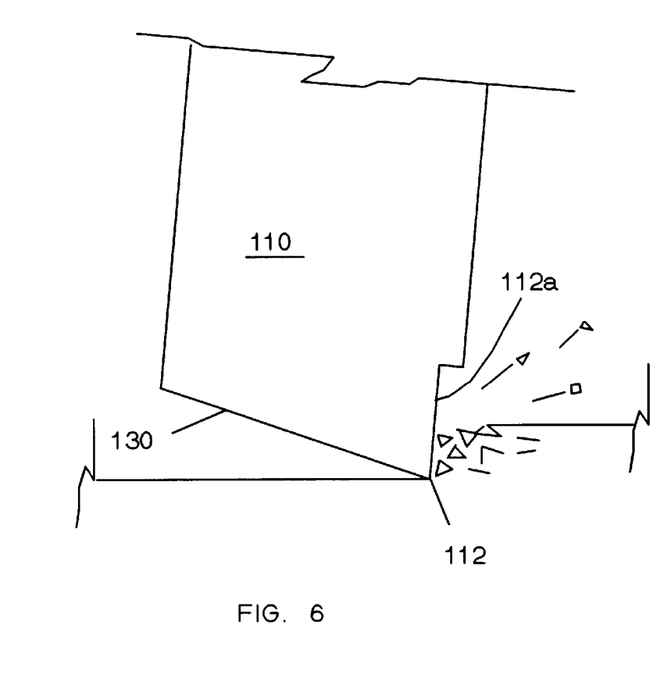

As the spindle and cutting head are rotated, either the workpiece, or the motor and spindle assembly, or both, are moved so that the cutting bits engage the workpiece with a feed rate which may be as high as 600 inches per minute. While side loads applied to the spindle may be relatively high, little axial force is needed to maintain the depth of cut due to high rotational speed of the spindle, which may be varied by flow control 18 as necessary. As shown in FIGS. 5 and 6, the 0–10 degree negative angle of surface 113 of bits 110, in conjunction with the high rotational speed of head 98, scrapes material from the workpiece with a chipping and shearing action which fractures material just ahead of surface 113. As such, there are no downward axial forces on bits 110 caused by a digging action that occurs with conventional cutting bits having cutting edges grounder mounted at a positive angle, this digging action believed to cause the conventional bits to hang or chatter, or otherwise become damaged. Further, the negative angle of the tool bits of the instant invention causes cutting edges thereof to have an inordinately long lifespan because the cutting edges are not conventionally used for cutting. Rather, surfaces 112a FIGS. 3–4, shear material from the workpiece, while cutting edges 112 scrape the sheared surface smooth. With respect to FIGS. 8 and 9, edges 214 and 222 similarly shear and scrape material to be removed from the workpiece. Additionally, the shearing action of the instant invention generates far less heat, with what heat that is generated being localized in the removed material. This eliminates the need for a coolant, with no significant heat buildup in the workpiece that would otherwise cause warpage of metals and delamination of composites.

As cutting proceeds, the forward edges of tool 98, which are advancing into the workpiece, remove the bulk of material by the described shearing action, while the trailing edges 112 scrape the cut regions smooth. Any vibrations that are generated are absorbed and greatly reduced by the hydraulic cushion provided by the pressurized hydraulic fluid between the moving and stationary parts of the hydraulic motor, which vibrations otherwise contributing to chipping and wear of the cutting bits. After the cut is completed, a different spindle assembly for performing a different machining operation may be clamped in fixture 29, and the other operation initiated. The geometry of cutting edges or surfaces of these other tools would be generally as described, i.e. being neutral or negatively angled so as to remove material from the workpiece with a shearing action so as to generate less heat, which heat being localized in the removed material. For surface cutting, profiling and other operations such as friction stir welding that require side movement of the cutter through the workpiece, a high torque motor and spindle assembly may be used as shown and described in FIG. 7. As stated, due to the lower RPMs of this motor, larger diameter cutting heads may be employed in conjunction with higher feed rates than are possible with electric spindles of the prior art.

Having described my invention and the manner of its use, it is apparent that other configurations of cutting bits may be designed using neutral and negative cutting angles, and other hydraulic motor and spindle designs and hydraulic power systems may be implemented, these designs fairly falling within the scope of the following appended claims, wherein I claim:

1. A metal and composite material working system comprising:
    (1) a source of pressurized hydraulic fluid,
    (2) a hydraulic motor coupled to said source of pressurized hydraulic fluid and having a powered output shaft,
    (3) a spindle having a spindle shaft directly connected to said powered output shaft, said spindle shaft rotatably supported in a housing directly connected to said motor,
    (4) a tool coupled to said spindle shaft and adapted for rotatably engaging a workpiece,
    (5) computer controlled machine tool mounting means configured for mounting said hydraulic motor and spindle assembly to a computer controlled machine tool in movable, accurately controllable relation with said workpiece so that said tool accurately engages said workpiece.

2. A metal and composite material working system comprising:
    (1) a high pressure, high powered source of hydraulic fluid,
    (2) a hydraulic motor capable of developing power inherent in said high pressure, high powered source of hydraulic fluid, said motor coupled to said high pressure, high powered source of hydraulic fluid and having an output shaft, (3) a spindle having a spindle shaft coupled to said powered output shaft, said spindle shaft rotatably supported in a housing coupled to said motor, said motor and said housing configured to be readily mounted to a movable robotic member, (4) a material working tool coupled to said spindle shaft for rotatably engaging a workpiece.

3. A system as set forth in claim 1 wherein said source of hydraulic fluid provides said hydraulic fluid at a constant flow rate.

4. A system as set forth in claim 3 wherein said constant flow rate is adjustable in order to adjustably vary rotational speed of said hydraulic motor and said spindle shaft.

5. A system as said forth in claim 1 wherein said hydraulic motor is a high torque hydraulic motor.

6. A system as set forth in claim 5 wherein said tool further comprises a shaft, and a plurality of cutting edges on an end of said shaft, said cutting edges extending generally perpendicular and radially from an axis of said shaft, and said cutting edges angled from neutral radial rake to a negative radial rake.

7. A system as set forth in claim 6 wherein said tool further comprises a plurality of flutes spiraling around said shaft in a direction opposite that of rotation of said tool, whereby as said tool rotates in said workpiece, axial forces that otherwise would draw the tool into the workpiece are eliminated.

8. A system as set forth in claim 7 wherein said tool is constructed of a material suitable for receiving a coating of a substance having a hardness in excess of Rockwell C90.

9. An end mill adapted to be mounted in a high power hydraulically powered spindle, said end mill capable of functioning as a drill and comprising:

a shaft, a plurality of cutting edges on an end of said shaft, said plurality of cutting edges being generally perpendicular to an axis of said shaft and having a neutral to negative radial rake for scraping and shearing material from a workpiece, and a plurality of spiral flutes along sides of said shaft, said spiral flutes spiraling about said shaft in a direction opposite to rotation of said shaft so that axial forces that otherwise would tend to draw said end mill into said workpiece are eliminated, whereby wear and breakage of said end mill is greatly reduced.

10. An end mill as set forth in claim 9 wherein said end mill is provided with a substrate suitable for receiving a coating of a material having a hardness of Rockwell C90 or more.

11. A system as set forth in claim 7 wherein edges of said tool adjacent said flutes are sharpened with a neutral to negative axial rake, enabling said tool to function as a milling tool that shears and scrapes material from said workpiece.

12. A system as set forth in claim 1 wherein said hydraulic motor is powered by a pump motor and hydraulic pump combination wherein said pump motor is at least approximately 10 horsepower.

13. A system as set forth in claim 2 wherein said high pressure, high powered source of hydraulic fluid is developed by a motor and hydraulic pump combination of approximately 10 horsepower.

14. A system as set forth in claim 13 wherein said hydraulic motor is a high torque hydraulic motor.

15. A system as set forth in claim 14 wherein said material working tool is provided with cutting edges along a periphery thereof, said cutting edges having a neutral to negative axial rake, for shearing and scraping material from said workpiece.

16. A system as set forth in claim 14 wherein said material working tool is provided with cutting edges on an end thereof, said cutting edges having a neutral to negative radial rake, for shearing and scraping material from said workpiece.

* * * * *